3,394,074
SINGLE REACTOR HYDROCRACKING PROCESS WITH MIXED NONNOBLE METAL CATALYST FOR FULL BOILING RAW FEED
Fred J. Buchmann, Baton Rouge, Ralph Burgess Mason, Denham Springs, and Glen Porter Hamner, East Baton Rouge, La., assignors to Esso Research and Engineering Company, a corporation of Delaware
Filed Apr. 3, 1967, Ser. No. 627,806
6 Claims. (Cl. 208—111)

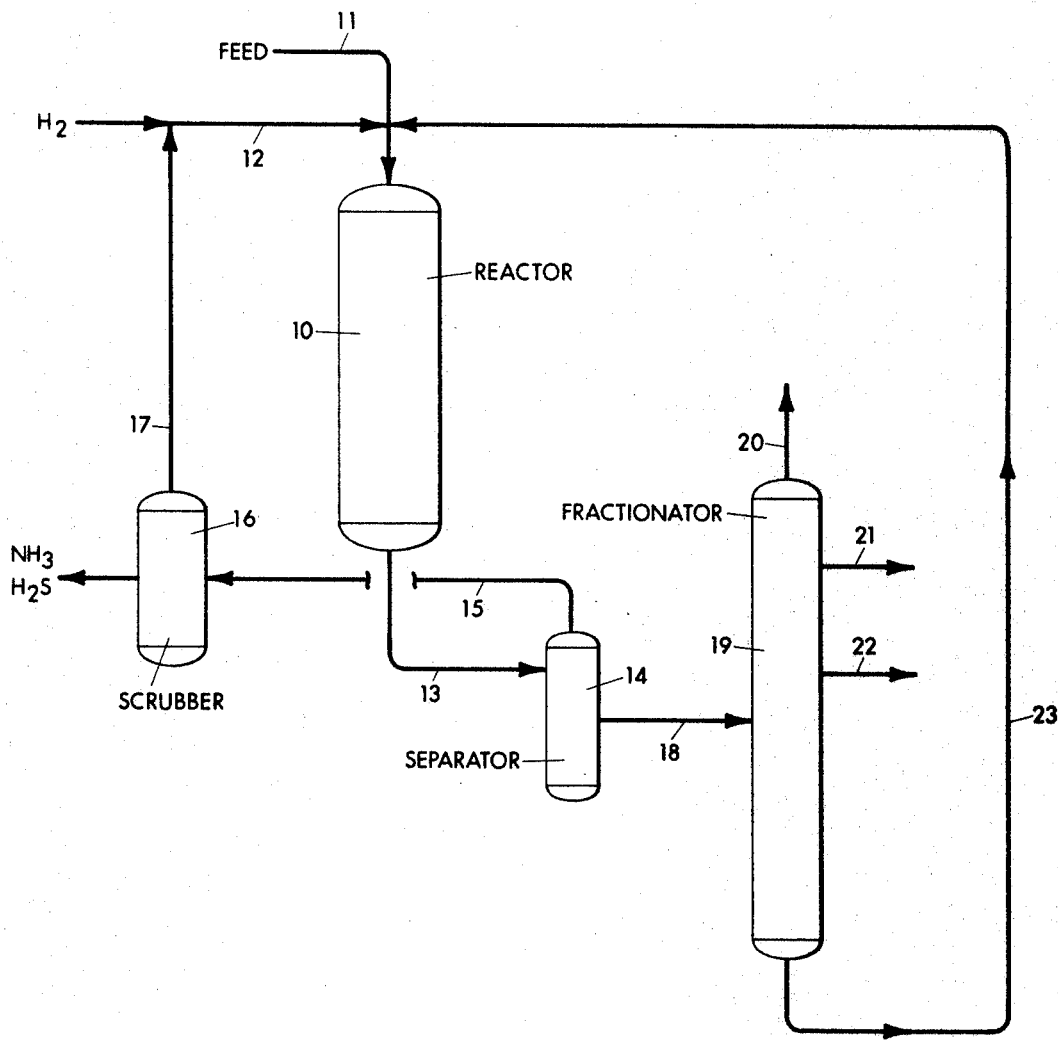

ABSTRACT OF THE DISCLOSURE

A single reactor hydrocracking process for use with a full boiling range raw feed containing relatively high concentrations of nitrogen and sulfur compounds. The process employs a mixed nonnoble metal catalyst composite on a crystalline aluminosilicate zeolite base which catalyst has substantial hydrodenitrogenation activity thereby eliminating the necessity of prehydrofining the feed. Enhancement of the hydrodenitrogenation activity of the catalyst may be obtained by utilizing a conventional hydrofining catalyst as a binder for the hydrocracking catalyst. Additionally, the hydrocracking activity of the mixed nonnoble metal catalyst composite on the crystalline aluminosilicate zeolite base may be further improved by cation exchanging the zeolite with a rare earth salt so as to incorporate some rare earth metal therein.

Background of the invention

Early hydrocracking processes require the use of multiple reactor vessels in order to accommodate the various catalyst stages. The first catalyst stage was a hydrofining stage utilizing a hydrogenation component such as cobalt molybdate on an essentially noncracking amorphous metal oxide base such as silica or alumina. It was desirable to run the hydrofining operation at the mildest conditions possible so as to minimize any cracking over the hydrofining catalyst since the hydrofining catalysts produce cracked products of extremely poor octane quality. However, the initial hydrocracking catalysts comprising hydrogenation metals such as nickel, cobalt, platinum, palladium, etc. on amorphous metal oxide cracking supports were extremely sensitive to the presence of nitrogen and would suffer a severe activity drop if exposed thereto. Thus, when feeds containing substantial amounts of nitrogen compounds were processed it was necessary to operate the hydrofiner at sufficiently severe conditions to obtain nearly total conversion of the nitrogen compounds to ammonia which was removed from the product stream prior to the hydrocracking stage or stages. This severe hydrofining operation represented large debits to the refiner since portions of the feed were being converted to undesirable products, the removal of the ammonia required added investment in fractionation and scrubbing facilities and finally the overall operating expenses were substantially increased for the process.

Some of these problems were partially alleviated by the introduction of second generation hydrocracking catalysts which utilized crystalline aluminosilicate zeolites as cracking bases.

It was discovered that a palladium on hydrogen faujasite catalyst was more tolerant to the presence of nitrogen during hydrocracking than the previous amorphous based materials thereby allowing the refiner to operate the hydrofiner at more moderate conditions thus reducing or even eliminating the generally undesirable cracking of feed in the hydrofiner.

Summary of the invention

The present invention is based on the unexpected discovery that a singular mixed nonnoble metal catalyst on a hydrogen or hydrogen-precursor form crystalline aluminosilicate zeolite base exhibits very superior hydrocracking activity and activity maintenance in the presence of extremely high concentrations of nitrogen and sulfur compounds such as are found in raw (i.e., unhydrofined or treated) full boiling range feedstocks. What makes this finding so surprising is that commercial palladium on hydrogen faujasite catalysts which are known for their relatively high degree of nitrogen tolerance are completely deactivated shortly after exposure to the same feedstock at hydrocracking conditions.

The catalyst utilized in the practice of the present invention is a nickel-tungsten on a hydrogen or hydrogen precursor (i.e., ammonia ion) form of a crystalline aluminosilicate zeolite having the crystal structure of a faujastite and a silica to alumina mol ratio greater than 3. The denitrogenation activity of the catalyst can be enhanced by compositing it with a binder which contains a conventional hydrofining catalytic material. Additionally, the base hydrocracking activity of the catalyst used in the present invention may be increased by treating the zeolite with a rare earth solution so as to introduce some rare earths therein by means of ion exchange.

The use of a hydrocracking catalyst which exhibits a high order of activity and catalyst life in the presence of raw feedstocks has resulted in a process which requires only a single reactor to accomplish the desired denitrogenation, desulfurization, and hydrocracking functions. Use of only a single reactor results in obvious substantial investment and operating cost savings to the refiner. Furthermore, the products produced exhibit the desired selectivity to high octane products thereby eliminating the problem of undesirable precracking in the hydrofining zone.

Description of the preferred embodiments

The catalyst employed in the practice of the single reactor hydrocracking process of the present invention as indicated previously comprises a nickel-tungsten hydrogenation component composited with a cracking base of a crystalline aluminosilicate zeolite having a faujasite crystalline structure, a uniform pore size structure, and a silica-to-alumina mol ratio greater than about 3. Zeolites having the desired faujasite structure may be either natural or synthetic and will have a formula which in the dehydrated state conforms to the following:

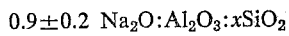

$$0.9 \pm 0.2 \ Na_2O:Al_2O_3:xSiO_2$$

where $x$ may be 3 to about 6 or even higher if the zeolite is subjected to selective alumina removal procedures. A particularly preferred form of the crystalline aluminosilicate zeolite is represented by zeolite Y which is commercially available from the Linde Division of Union Carbide Corporation.

In order to be placed in a form useful in the practice of the process of the present invention, the sodium form of the zeolite is modified by cation exchange with hydrogen ion or an ion convertible into hydrogen ion such as ammonium ion by exchange procedures now well known in the art. It is generally desirable to replace a sufficient amount of the original sodium ion so that the exchanged zeolite composition has a sodium content of less than 2 wt. percent, preferably less than 1.5 wt. percent.

The nickel-tungsten hydrogenation component is introduced into the crystalline aluminosilicate zeolite by any one of several alternative methods. For example, it is possible to employ impregnation techniques previously used in the art to prepare nickel-tungsten or amorphous base catalysts. These techniques involve treating the catalyst base with solutions containing nickel and tungsten either separately or in combination in a single solution so as to deposit these catalytic materials on the base surface. See in this regard U.S. Patents Nos. 2,690,433; 3,232,887 and 3,280,040 for descriptions on procedures used in introducing nickel and tungsten onto various types of catalyst support materials.

It is also possible to prepare the nickel-tungsten catalyst by introducing the nickel into the cation exchange sites of the sodium or more preferably the ammonium form of the crystalline aluminosilicate zeolite. This is accomplished by treating the zeolite with an aqueous solution of an exchangeable nickel salt such as nickel chloride. The resulting nickel exchanged ammonium zeolite is then treated with an ammonium tungstate solution to yield a dispersed nickel-hungsten composite at or near the exchange sites of the ammonium form aluminosilicate zeolite. Upon calcining at elevated temperatures the ammonium form of the aluminosilicate decomposes to yield a nickel-tungsten on the hydrogen form of the aluminosilicate zeolite.

While the method of preparation of catalysts is not critical to their operability in a single reactor hydrocracking process of the present invention, it is believed that the latter procedure utilizing a first exchange step with nickel ion followed by treatment with ammonium tungstate results in catalysts exhibiting superior activity maintenance properties and thus such procedure of preparation would be preferred.

In any event, the preparative procedure should result in a catalyst containing from 2 to 8 wt. percent, preferably 3 to 7 wt. percent nickel (based on the metallic form although not necessarily existing as such) and from 5 to 20 wt. percent, preferably 6 to 15 wt. percent of tungsten (based on the metal as above) with the remaining portion comprising the crystalline aluminosilicate zeolite.

Suitable feedstocks for use in the single reactor hydrocracking process are described in Table I and are examples of full boiling range, high nitrogen content raw feeds.

TABLE I.—TYPICAL FEED INSPECTIONS

| Feed No. | 1 | 2 |
| --- | --- | --- |
| Gravity, °API | 23.2 | 22.2 |
| Nitrogen, p.p.m. by wt | 871 | 1,070 |
| Sulfur, Wt. Percent | 1.80 | 1.93 |
| Distillation, | | |
| IBP,° F | 405 | 586 |
| 5% at ° F | 446 | 680 |
| 50% at ° F | 514 | 772 |
| 95% at ° F | 625 | 878 |
| FBP,° F | 641 | 895 |

It is thus evident that the feedstocks utilized in the process of this invention comprise full boiling range such as 400–1050° F., raw feeds which can have nitrogen contents in the range between about 200 to 4000 p.p.m. and sulfur contents in the range between about 0.3 to 3.0%.

The reaction conditions employed in the practice of the present invention are summarized below in Table II.

TABLE II.—TYPICAL REACTOR CONDITIONS—SINGLE REACTOR HYDROCRACKING

| | Operating Range | Preferred Range |
| --- | --- | --- |
| Temperature, ° F | 550–800 | 700–760 |
| Pressure, p.s.i.g | 500–3,000 | 1,000–2,000 |
| Feed Rate, v./v./hr | 0.3–6.0 | 0.5–3.0 |
| $H_2$ Rate, s.c.f./b | 2,000–10,000 | 4,000–8,000 |

The single reactor hydrocracking process of the present invention is more clearly understood by reference to the figure which is a schematic flow plan of a representative process unit.

A full boiling range, unhydrofined feed is introduced into reactor vessel 10 through feed inlet line 11. Hydrogen and recycle gas are introduced with the feed by means of gas inlet line 12. Make-up hydrogen can be provided from refinery off gases such as reformer tail gas. It is desirable to maintain the hydrogen concentration above about 80 percent in the make-up stream so as to minimize the pressure requirements in the unit needed to keep the hydrogen partial pressure up to the necessary levels. Operating conditions in reactor vessel 10 are selected from the ranges outlined in Table II above. The nickel-tungsten on hydrogen faujasite catalyst is present in the reactor in the form of a fixed bed. While the figure indicates that the feed is introduced in a downflow manner over the catalyst, it is, of course, understood that the flow direction is a matter of choice and is not critical to the operation of the process.

Hydrocracked products, unconverted feed and reaction gases are removed from the reactor through outlet line 13 and are led to high pressure separator 14 where a gas-liquid split is effected. The recovered gas phase containing hydrogen, ammonia and hydrogen sulfide is taken to scrubber 16 through line 15. In the scrubber, ammonia and some of the hydrogen sulfide are removed from the recycle gas stream in order to prevent excessive build-up of these materials in the system. Scrubbed recycle gas comprising mostly recycle hydrogen is returned to the make-up hydrogen line through line 17.

The liquid phase collected in separator 14 is directed to fractionator tower 19 through line 18. A $C_4$–light ends cut is taken off the top of the fractionator and sent to a light ends treating unit through line 20. Sidestream cuts may include a $C_5$–180° F. cut which can be utilized as a motor gasoline blending stock through line 21 and a 180–375° F. cut via line 22 which can also be used in motor gasoline blending directly or can be used as a reformer feed to obtain an even higher octane product. In addition a 375° F. bottoms can be collected and this material can be recycled to extinction by returning it to reactor 10 through bottoms recycle line 23.

The preparation of a nickel-tungsten on hydrogen faujasite catalyst which may be utilized in the single reactor hydrocracking process described above is made more clear by reference to Example 1, below.

EXAMPLE 1

This example demonstrates alternate methods of preparing the mixed nonnoble metal catalyst of the present invention.

Preparation A.—For this preparation a nickel faujasite prepared by the nickel exchange of ammonium faujasite was reacted with an ammonium tungstate solution. The exchange of the ammonium faujasite with nickel was employed because nickel does not exchange as readily and as completely with the sodium form as other cations, e.g. zinc and ammonium ions. An alternate to the double ion exchange, i.e. the ammonium ion and the nickel ion is the exchange with ammoniacal nickel salt solutions to reduce the sodium ion to an acceptable level. In the preparation of the superior nickel tungstate catalyst, a charge of 500 grams of sodium faujasite was first converted to the ammonium ion modification by suspension in 1000 cc. of water and, while agitating at room temperature, a solution of one pound of ammonium chloride in 1500 cc. of water was added and agitation was continued for four hours. The treating solution was removed by filtration and the wet cake was water washed upon transfer to 2000 cc. of water and agitation for one hour. Using the wet cake from filtration following the wash after the first exchange a second and then a third exchange was made with fresh ammonium chloride solutions as in the first instance, except that three water washes were employed after the third exchange. The three-fold ammonium ion exchanged and washed faujasite was air dried on the filter for subsequent exchange with nickel ion.

This ammonium faujasite was suspended in 1000 cc. of water and a solution of one pound of nickelous chloride in 1500 cc. of water was added, while agitating thoroughly with a mechanical stirrer, and agitation was continued for four hours at room temperature. As in the ammonium ion exchange, three such exchanges were made with fresh nickelous chloride as in the first instance with one water wash each after the first and second exchanges and three water washes after the third exchange. These washes consisted of suspension of the wet cake from the previous filtration in 2000 cc. of water and agitation for one hour at room temperature followed by filtration to remove the treating solution and/or wash water. The three-fold and washed nickel faujasite was reacted with ammonium tungstate solution as follows:

A charge of 100 grams of tungstic acid was treated with 1000 grams of concentrated ammonium hydroxide for two hours at 150° F. Thereupon, excess ammonia was removed by evaporation at about 200° F. until about 500 cc. remained. The solution was diluted to 3000 cc. which was sufficient to maintain complete solution at 150° F. This ammonium tungstate solution at 150° F. was transferred to a 5 liter flask equipped with a sealed stirrer and the nickel faujasite, described above, was added in small increments while stirring. Agitation was continued for 24 hours at about 150° F. using a reflux condenser to prevent evaporation losses. Thereupon, the treating liquid was removed by filtration and the filter cake was dried overnight in a vacuum oven at 150° F. This catalyst possessed about 87% of the faujasite crystallinity as evaluated by X-ray determination and by chemical methods analyzed as follows:

| | Wt., percent |
|---|---|
| Ni | 5.8 |
| W | 9.9 |
| Sodium | 1.95 |

Since the atomic ratio of nickel to tungsten is 1.8 it is concluded that the catalyst consists of hydrogen-nickel faujasite together with an intimate dispersion of nickel tungstate at or near the exchange sites.

Preparation B.—This preparation utilizes an impregnation technique for preparing the nickel tungsten catalyst of the present invention. Such a catalyst was prepared by impregnating 145 grams of a moist cake of ammonium faujasite with a solution containing 29.7 grams of nickelous nitrate $(Ni(NO_3)_2 \cdot 6H_2O)$ in 25 cc. of water. Thereupon, a solution of 14.7 grams of ammonium metatungstate in 25 cc. of water was added and the resulting paste was heated on a hot plate until the gummy characteristic was removed and then the catalyst cake was dried overnight at 212° F. in a vacuum oven. The catalyst analyzed 5.9% nickel and 12.3 wt. percent $WO_3$ and by X-ray analysis retained 86.0% of the faujasite crystallinity.

EXAMPLE 2

This example demonstrates representative runs of the process of the present invention using as a catalyst the nickel-tungsten on hydrogen faujasite prepared in Example 1. The feedstocks used are Feeds 1 and 2 from Table I. For the purpose of comparison, a run was conducted utilizing Feed 1 and a palladium on hydrogen faujasite catalyst at identical conditions to that used for the corresponding nickel-tungsten on hydrogen faujasite catalyst. The data from these runs are summarized in Table III below.

TABLE III.—HYDROCRACKING RAW FEEDS IN SINGLE REACTOR OPERATION

| | Feed No. | | |
|---|---|---|---|
| | 1 | 1 | 2 |
| Catalyst | Pd-H-Faujasite a | Example 1A | Example 1A |
| Run, hours | 342-359 | 342-551 | 696-801 |
| Pressure, p.s.i.g | 1,500 | 1,500 | 1,500 |
| Feed Rate, v./hr./v | 1 | 1 | 1 |
| Hydrogen Rate, s.c.f./b | 8,000 | 8,000 | 8,000 |
| Temperature, °F | 715 | 715 | 760 |
| Product: | | | |
| Gravity, °API | 26.4 | 42.8 | 45.5 |
| Conversion to 400-° F., percent | <6 | 61 | 61 |
| Octane (Research + 3 cc. Lead) 180-375° F. naphtha | | 95 | | a 0.5% Pd on the hydrogen form of faujasite.

It is evident that the palladium on hydrogen faujasite catalyst was essentially deactivated for the hydrocracking of Feed 1, after less than 342 hours on stream while the nickel-tungsten form was still exhibiting a high order of activity after 551 hours. Furthermore, the nickel-tungsten embodiment showed a surprising maintenance of activity for the hydrocracking of Feed 2 (which is more refractory than Feed 1) with only a relatively small temperature increase after over 800 hours on stream with that feed.

It is a further part of the present inventive concept to utilize a nominal hydrofining catalyst in conjunction with and as a binder for pilling the nickel-tungsten on hydrogen faujasitec atalyst. While the hydrofining catalyst serves as a binder for pilling and this is necessary, it also serves to enhance the hydrodenitrogenation and hydrocracking activity of the combination and therefore the combination has both enhanced denitrogenation and hydrocracking activity. The nominal hydrofining catalysts that can be used in this service include nickel-tungsten on a wide variety of bases such as alumina, $SiO_2$–$Al_2O_3$ cracking catalyst, $SiO_2$–$B_2O_3$, $SiO_2$–MgO and others. In addition to nickel-tungsten, the active metals may be nickel molybdenum, cobalt-molybdenum, cobalt-tungsten or others. The amount of active metal in the hydrofining catalyst binder should be in the range of from 8 to 40 wt. percent preferably 12 to 20 wt. percent on the total hydrofining catalyst component. The amount of hydrofining catalyst binder used in the catalyst composition of the present preferred embodiment may be in the range of 10 to 70 wt. percent, preferably 15 to about 40 wt. percent, based on the final catalyst composition.

The catalyst used in the process of the present invention may be further modified by the addition of rare earths by nominal exchange methods. It is preferable to treat the faujasite base with the rare earths prior to pelleting it with the hydrofining catalyst although either procedure will result in a useable catalyst. The sequence for treating the faujasite base (which is in the $NH_4+$ form) could be either:

(1) Nickel salt, rare earth salt and then ammonium tungstate, or
(2) Rare earth salt, nickel salt and then ammonium tungstate, or
(3) Nickel salt, ammonium tungstate and finally rare earth salt.

It is desirable to conduct the rare earth exchange in such a manner as to have at least about 40% of the available sites on the faujasite neutralized by the rare earths. In such compositions less than about 15% of the sites should be neutralized by sodium and the remaining sites may be occupied by hydrogen or a hydrogen precursor. The methods used to introduce rare earths into zeolites and the types of rare earth mixtures available for this purpose are described in U.S. 3,140,252 and need not be described in detail in this paper.

It should be further noted that the nickel-tungsten catalyst requires sulfiding to allow it to exhibit a high level of catalytic activity. This can be most readily accomplished by pretreating the catalyst with a sulfur containing compound, preferably $H_2S$ prior to use. Sulfiding can also be accomplished by running the catalyst on a high sulfur feed prior to running it for the hydrocracking operation. It is further desirable to run the hydrocracking process at sour conditions. Thus if the feedstock used has a low sulfur content, additional sulfur should be added to the hydrocracking zone by adding $H_2S$ or a sulfur compound convertible to $H_2S$ at hydrocracking conditions to the feed or directly to the reaction zone.

What is claimed is:
1. A process for hydrocracking a full boiling range raw petroleum feedstock containing more than about 200 p.p.m. nitrogen compounds and more than about 0.3% sulfur compounds in a single reactor vessel, said process comprising contacting said feedstock at hydrocracking conditions in the presence of added hydrogen with a catalyst composition comprising 2 to 8 wt. percent nickel, 5 to 20 wt. percent tungsten and the remaining portion comprising a crystalline aluminosilicate zeolite having a uniform pore size, a crystal structure that of faujasite and a silica-to-alumina mol ratio greater than about 3, said zeolite having been cation exchanged so as to reduce its sodium content to below about 2.0 wt. percent based on the zeolite, with a cation selected from the group consisting of hydrogen ions and hydrogen precursor ions; and collecting a product stream having a lower boiling range than the said feedstock.

2. The process of claim 1 wherein said hydrocracking conditions comprise a temperature in the range from about 550 to 800° F., a pressure in the range from about 500 to 3000 p.s.i.g., a space velocity in the range from about 0.3 to 6.0 v./v./hr. and a hydrogen rate in the range from about 2000 to 10,000 s.c.f./b.

3. The process of claim 1 wherein said hydrocracking catalyst comprises from 10 to 70 wt. percent of a hydrofining catalyst binder and from 90 to 30 wt. percent of said nickel-tungsten crystalline aluminosilicate zeolite catalyst.

4. The process of claim 3 wherein said hydrofining catalyst binder contains 8 to 40 wt. percent of nickel-tungsten based on said binder.

5. The process of claim 1 wherein said hydrocracking catalyst is sulfided prior to the completion of said hydrocracking process by contacting said hydrocracking catalyst with a sulfur-containing compound.

6. The process of claim 1 wherein said product stream is fractionated into distillate fraction cuts and a bottoms cut and the said bottoms cut is recycled to said reactor vessel to extinction.

References Cited

UNITED STATES PATENTS

| | | | |
|---|---|---|---|
| 3,147,206 | 9/1964 | Tulleners | 208—56 |
| 3,346,482 | 10/1967 | Arey et al. | 208—111 |

DELBERT E. GANTZ, *Primary Examiner.*

A. RIMENS, *Assistant Examiner.*